United States Patent
Zheng et al.

(10) Patent No.: US 10,716,296 B2
(45) Date of Patent: Jul. 21, 2020

(54) FLOATING OFFSHORE WIND TURBINE INTEGRATED WITH STEEL FISH FARMING CAGE

(71) Applicants: Graduate School at Shenzhen, Tsinghua University, Shenzhen, Guangdong (CN); POWERCHINA Huadong Engineering Corporation Limited, Hangzhou, Zhejiang (CN)

(72) Inventors: Xiangyuan Zheng, Guangdong (CN); Yu Lei, Guangdong (CN); Wei Li, Zhejiang (CN); Shengxiao Zhao, Zhejiang (CN); Daoyi Chen, Guangdong (CN); Yi Li, Guangdong (CN)

(73) Assignees: GRADUATE SCHOOL AT SHENZHEN, TSINGHUA UNIVERSITY, Shenzhen, Gunagdong (CN); POWERCHINA HUADONG ENGINEERING CORPORATION LIMITED, Hangzhou, Zhejiang (CN)

(*) Notice: Subject to any disclaimer, the term of this patent is extended or adjusted under 35 U.S.C. 154(b) by 70 days.

(21) Appl. No.: 16/182,285

(22) Filed: Nov. 6, 2018

(65) Prior Publication Data
US 2019/0141963 A1 May 16, 2019

Related U.S. Application Data

(63) Continuation of application No. PCT/CN2017/116638, filed on Dec. 15, 2017.

(30) Foreign Application Priority Data

Nov. 15, 2017 (CN) .......................... 2017 1 1133048

(51) Int. Cl.
*A01K 61/10* (2017.01)
*A01K 61/60* (2017.01)
(Continued)

(52) U.S. Cl.
CPC .............. *A01K 61/65* (2017.01); *A01K 61/10* (2017.01); *A01K 61/60* (2017.01); *B63B 1/041* (2013.01);
(Continued)

(58) Field of Classification Search
CPC ........ A01K 61/10; A01K 61/60; A01K 61/65; F03D 9/00; F03D 9/30
(Continued)

(56) References Cited

U.S. PATENT DOCUMENTS

| 4,147,130 A * | 4/1979 | Goguel ................... A01K 61/60 119/223 |
| 5,299,530 A * | 4/1994 | Mukadam .............. A01K 61/60 119/223 |

(Continued)

FOREIGN PATENT DOCUMENTS

| CN | 102106284 A | 6/2011 |
| CN | 104627331 A | 5/2015 |

(Continued)

OTHER PUBLICATIONS

International Search Report and Written Opinion issued in PCT/CN2017/116638, dated Jul. 31, 2018.

*Primary Examiner* — David J Parsley
(74) *Attorney, Agent, or Firm* — Hamre, Schumann, Mueller & Larson, P.C.

(57) ABSTRACT

A floating offshore wind turbine integrated with a steel fish farming cage mainly includes a wind turbine, a wind turbine tower, a living quarter, a floating wind turbine foundation in a conic steel structure, a mooring system, a lateral net (Continued)

encircling the floating wind turbine foundation, a bottom net, and lifting systems. The upper end of the wind turbine tower hosts a wind turbine, and the lower end of the wind turbine tower is fixed on the floating wind turbine foundation. In the present invention, the inner space of the floating wind turbine foundation is used to form a huge farming cage, which functions for the objectives of "power exploitation on the top and fish farming at the bottom". The foundation has excellent stability and seakeeping performance, and is applicable to deep waters.

14 Claims, 9 Drawing Sheets

(51) Int. Cl.
| | | |
|---|---|---|
| *A01K 61/65* | (2017.01) | |
| *F03D 9/00* | (2016.01) | |
| *F03D 9/30* | (2016.01) | |
| *F03D 13/25* | (2016.01) | |
| *B63B 35/44* | (2006.01) | |
| *B63B 1/04* | (2006.01) | |
| *F03D 9/43* | (2016.01) | |
| *B63B 1/10* | (2006.01) | |
| *F03D 9/25* | (2016.01) | |

(52) U.S. Cl.
CPC .............. *B63B 1/048* (2013.01); *B63B 1/107* (2013.01); *B63B 35/44* (2013.01); *F03D 9/00* (2013.01); *F03D 9/30* (2016.05); *F03D 9/43* (2016.05); *F03D 13/25* (2016.05); *B63B 2001/044* (2013.01); *B63B 2035/446* (2013.01); *F03D 9/255* (2017.02); *F05B 2220/30* (2013.01); *F05B 2240/93* (2013.01); *F05B 2240/95* (2013.01)

(58) Field of Classification Search
USPC ............. 119/215, 223; 290/44, 55; 405/224; 416/85
See application file for complete search history.

(56) References Cited

U.S. PATENT DOCUMENTS

| | | | |
|---|---|---|---|
| 5,549,076 A * | 8/1996 | Kaarstad ................ | A01K 61/60 119/223 |
| 5,845,602 A * | 12/1998 | Kaarstad ................ | A01K 61/60 119/223 |
| 7,075,189 B2 * | 7/2006 | Heronemus ............. | B63B 1/047 290/44 |
| 8,235,629 B2 * | 8/2012 | Jakubowski ............ | F03D 13/22 405/224 |
| 8,622,011 B2 * | 1/2014 | Jahnig .................... | F03D 13/22 114/267 |
| 8,752,495 B2 * | 6/2014 | Jahnig .................... | F03D 13/25 114/264 |
| 9,394,035 B2 * | 7/2016 | Dagher ................... | B63B 21/50 |
| 2006/0062676 A1 * | 3/2006 | Jakubowski ............ | B63B 35/44 416/244 R |
| 2006/0082160 A1 * | 4/2006 | Lee ......................... | F03D 9/25 290/55 |
| 2010/0194115 A1 * | 8/2010 | Jakubowski ............ | E02D 27/42 290/55 |
| 2010/0219645 A1 * | 9/2010 | Yamamoto .............. | F03D 1/04 290/55 |

FOREIGN PATENT DOCUMENTS

| | | |
|---|---|---|
| CN | 105557572 A | 5/2016 |
| CN | 106035143 A | 10/2016 |
| CN | 106818580 A | 6/2017 |
| CN | 107150769 A | 9/2017 |
| CN | 207607612 U | 7/2018 |

* cited by examiner

FLOATING OFFSHORE WIND TURBINE INTEGRATED WITH STEEL FISH FARMING CAGE

CROSS REFERENCE TO RELATED APPLICATIONS

This application is a continuation application of PCT/CN2017/116638, filed on Dec. 15, 2017. The contents of the above-mentioned application are all hereby incorporated by reference.

BACKGROUND

Technical Field

The present invention relates to the field of offshore wind power exploitation and aquaculture, and in particular, to a floating offshore wind turbine integrated with a steel fish farming cage.

Related Arts

Currently, as problems such as shortage of land resources, population explosion, and environmental deterioration become increasingly severe, more coastal countries have paid their attention to the ocean, accelerating the utilization of the ocean. A "Blue Revolution" which aims to exploit the ocean resources and energy has been rising all over the world.

As one of clean renewable energy, wind power has developed rapidly. As of 2015, the accumulated installed capacity of offshore and onshore wind power in China was 145362 MW, weighing more than 7% of the total installed capacity of electric power. Globally wind power has almost become the third largest source of electric power only after thermal power and hydropower. Compared with the onshore wind energy resource, the offshore wind speed not only is higher and more stable, but also has a shorter duration of low speed, so that the power generation rate of an offshore wind turbine is much more effective than the onshore counterpart. In addition, the construction of an offshore wind farm does not occupy land. Another advantage of the offshore wind farm is its location. Current offshore farms are located in the vicinity of coastal developed cities with dense population and large power requirements. As a result, the cost of power transmission can be greatly reduced. In particular, the wind exploitation in deep sea has the advantages of higher efficiency, zero visual pollution and little noise pollution. Based on these merits, the development of the offshore wind power, especially in deep sea, has become an important trend of the wind energy industry in the world since 2015.

So far offshore wind turbines use two dominant types of foundation. One is bottom fixed into seabed and the other one is floating on the sea surface. The bottom fixed foundation resists bending moment caused by the large thrust force of the wind on the nacelle. As water depth increases, the size of the foundation increases rapidly, leading to significant growth in both the construction cost and difficulty. The bottom fixed foundation has been proven feasible to projects in water depth less than 40 meters, while the floating foundation wind turbine is able to more economically and safely tackle deep seas of more than 100 meters. The floating concept is a must option for offshore deepwater wind farms. However, usually deep water also brings more severe sea states which challenges the design of a floating foundation.

For the marine aquaculture industry in China, the performance of fishing cages is so poor that they can hardly resist heavy waves in a storm like typhoon. Traditionally aquaculture cages are employed along the coastal line with water depth less than 20 meters. This inevitably raised the density of aquaculture and consequently polluted the environment of the aquaculture, inducing frequent fish diseases and low quality of fish. On the contrary, for deepwater marine aquaculture, the aquaculture farm is far from the coastal line. The ocean water is cleaner and has a higher capability of self-purification, which would greatly decrease the probability of fish diseases. In addition, compared to the coastal sea, the deep water ocean has richer and a wider variety of natural baits for the farmed fish in cages. Therefore, the farmed fish is almost as good as the wild fish in quality. Therefore, the deepwater aquaculture has become the main trend in China and several other countries. However, the primary material used by most of fishing cages is high-density polyethylene (HDPE). In a harsh sea environment like typhoon, the fishing net quickly deforms under the actions of waves and ocean currents which greatly decreases the contained water volume and living space in fishing cage. The most unfavorable consequence is that the HDPE cage is destroyed due to either fatigue damage or insufficient strength. The farmed fish will escape from the cage, bringing huge economic loss to the aquaculture. In deepwater open seas, large waves and high speed of currents are two main threats to the survival of HDPE cage. Use of HDPE cages has impeded the progress of deepwater aquaculture industry. Therefore, it is extremely urgent to develop a new concept of fish farming cage particularly for deep waters, but so far there is little breakthrough having been made by the engineering society.

In the near future, more and more offshore wind farms are to be commissioned in deep waters. If they are only used for power generation, the payback period for investment is excessively long. Another fact is that the marine aquaculture is also moving into deep waters. Supply of power is a demand by the fishing operation and has actually restricted the development of large-scale and intelligent caging facilities.

SUMMARY

Based on the foregoing background information, it is natural to come out an invention that integrates a floating wind turbine with a fishing cage by making use of their respective merits in functioning, although numerous problems in mechanics need to be handled carefully. This patent will overcome the disadvantages of technologies in offshore wind turbines and fishing cages.

A floating offshore wind turbine integrated with a steel fish farming cage includes a wind turbine, a wind turbine tower, a living quarter, a floating wind turbine foundation, and a mooring system, where the floating wind turbine foundation is a conic steel frame structure with a small top and a large bottom; the upper end of the wind turbine tower bears the weight of the wind turbine, and the lower end of the wind turbine tower is fixed onto the floating wind turbine foundation, the living quarter is at the wind turbine tower base to accommodate fish farming and turbine maintenance personnel; and the mooring system is used to connect the floating wind turbine foundation with the seabed; and the floating wind turbine foundation further includes a lateral net, a bottom net, and lifting systems, the lateral net is tensioned and attached onto each side facet of the conic floating wind turbine foundation, and the lifting systems are placed inside the floating wind turbine foundation and are connected to the bottom net, so that the bottom net can be lifted inside the floating wind turbine foundation.

The beneficial effects of the present invention include:

In the technical solutions of the present invention, the floating wind turbine foundation is in a conic shape with a small top and a large bottom. The whole system has a low center of gravity and in mechanics is unconditionally stable. The waterplane area of the floating wind turbine foundation is small and there are no large cross-section structural members near the waterplane, thus the floating wind turbine foundation is subjected to small wave forces. Besides, the draft of the floating wind turbine foundation is deep. As a result, the system has an excellent motion performance in waves. Moreover, the floating wind turbine foundation is installed with a fishing net system. Due to the effects of nets, the added mass and added damping of the floating wind turbine foundation in water are increased, very useful to improve the seakeeping motion performance of the floating wind turbine foundation. The floating wind turbine foundation adopts a steel-frame structure which has large stiffness and the lateral net is tensioned, so that the aquaculture cage almost has no deformation under waves and currents and the loss of the contained water volume in fishing cage is negligible. This will provide a constant and excellent growing environment for the farmed fish. The floating offshore wind turbine integrated with a steel fish farming cage in the present invention is applicable to deep waters within 200 meters. In the deep sea area, the water quality is superior to that in coastal areas and the farmed fish is as good as the wild fish in quality. Hence the economic benefit is greater. In addition, the floating wind turbine foundation as the main structure of the aquaculture cage helps to reduce the total cost, and the power generated by the wind turbine can be used as the power source of the aquaculture cage to resolve the power supply of the aquaculture cage in deep sea. The purpose of present invention is to achieve double objectives: "power exploitation on the top and fish farming at the bottom". Doing so, the deep water aquaculture gains remarkable economic benefits that would not have been achieved by offshore power generation only. This system is very suitable for wind power exploitation and marine aquaculture in deep seas in China and other countries.

DETAILED DESCRIPTION

Figure 1:
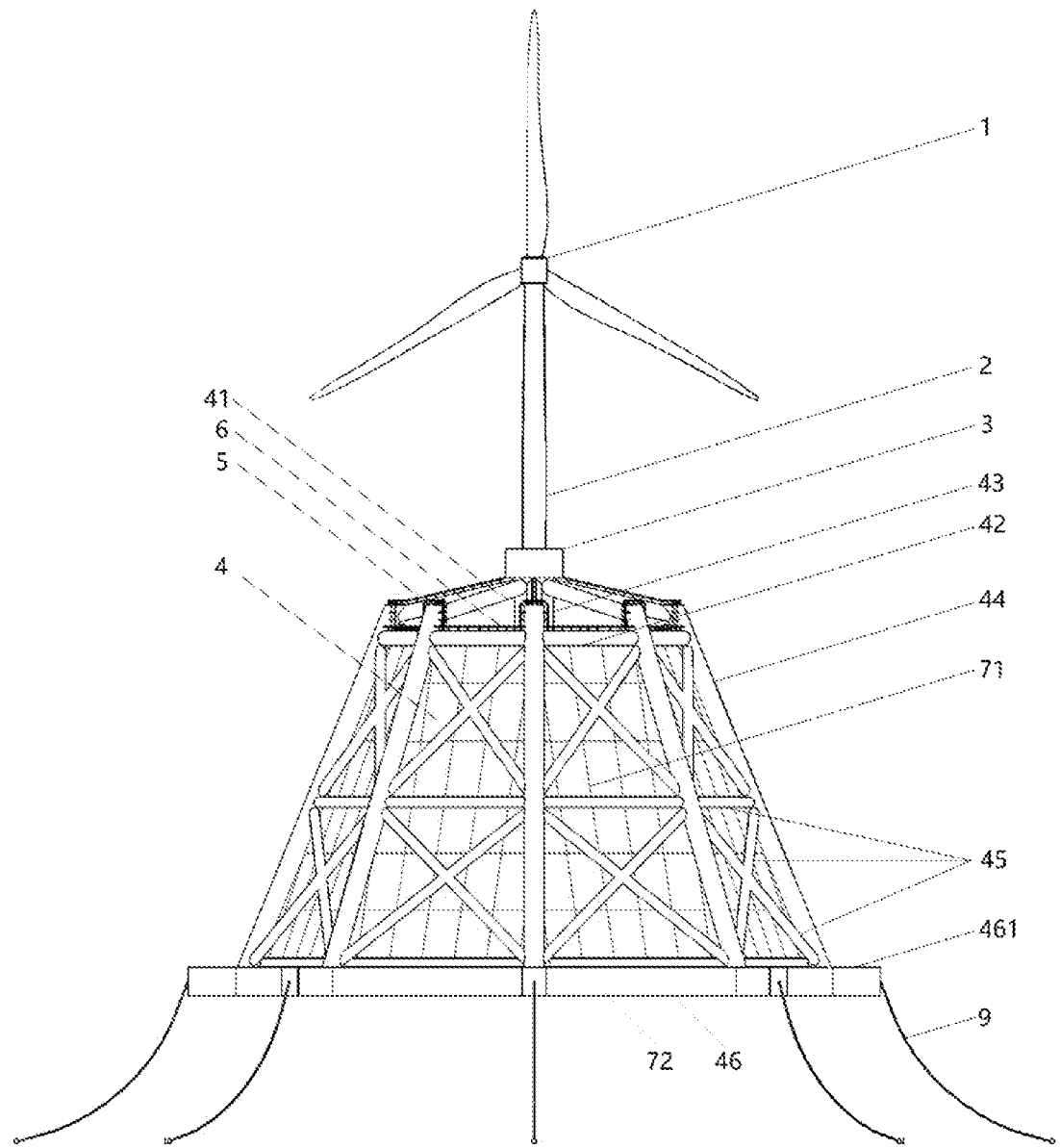
FIG. 1 is a front view of the floating offshore wind turbine integrated with a steel fish farming cage according to an embodiment of the present invention.

The following provides further detailed descriptions to preferred embodiments of the present invention with reference to the accompanying drawings.

As shown in FIG. 1 to FIG. 10, a floating offshore wind turbine integrated with a steel fish farming cage in an embodiment includes a wind turbine 1, a wind turbine tower 2, a living quarter 3, a floating wind turbine foundation 4, and a mooring system 9. The floating wind turbine foundation 4 is a conic steel structure with a small top and a large bottom. The upper end of the wind turbine tower 2 bears the wind turbine 1, and the lower end of the wind turbine tower 2 is fixed onto the floating wind turbine foundation 4. The living quarter 3 is at the bottom of the wind turbine tower 2. The mooring system 9 is connected to the floating wind turbine foundation 4, and is used to moor the floating offshore wind turbine to seabed. The floating offshore wind turbine further includes a lateral net 71, a bottom net 72, and lifting systems. The lateral net 71 is tensioned and attached onto each side facet of the conic floating wind turbine foundation 4. The lifting systems are placed inside the floating wind turbine foundation 4 and are connected to the bottom net 72, so that the bottom net 72 can be lifted in the floating wind turbine foundation 4. The bottom net 72 and the lifting systems form a winding and unwinding net system. During the normal operation period, the entire infrastructure is moored to the seabed by the mooring system 9, while the wind turbine 1 on the top generates power and the activity of fish farming is carried out inside the floating wind turbine foundation 4. Part of the power generated by the wind turbine 1 is supplied for fish farming, while the remaining power is transmitted to coastal cities in vicinity by submarine cables and booster stations.

Figure 9:
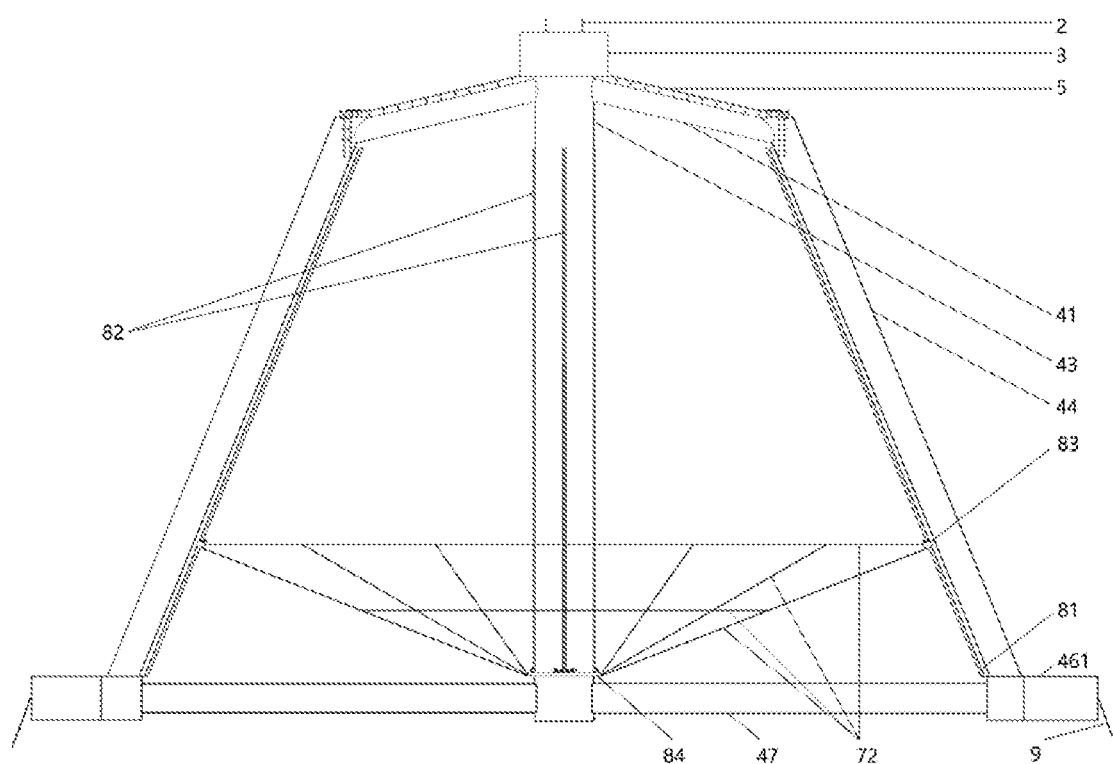
FIG. 9 is a schematic view of the position of the bottom net inside the floating offshore wind turbine foundation for collecting dead fish and precipitated baits according to an embodiment of the present invention.
Figure 10:
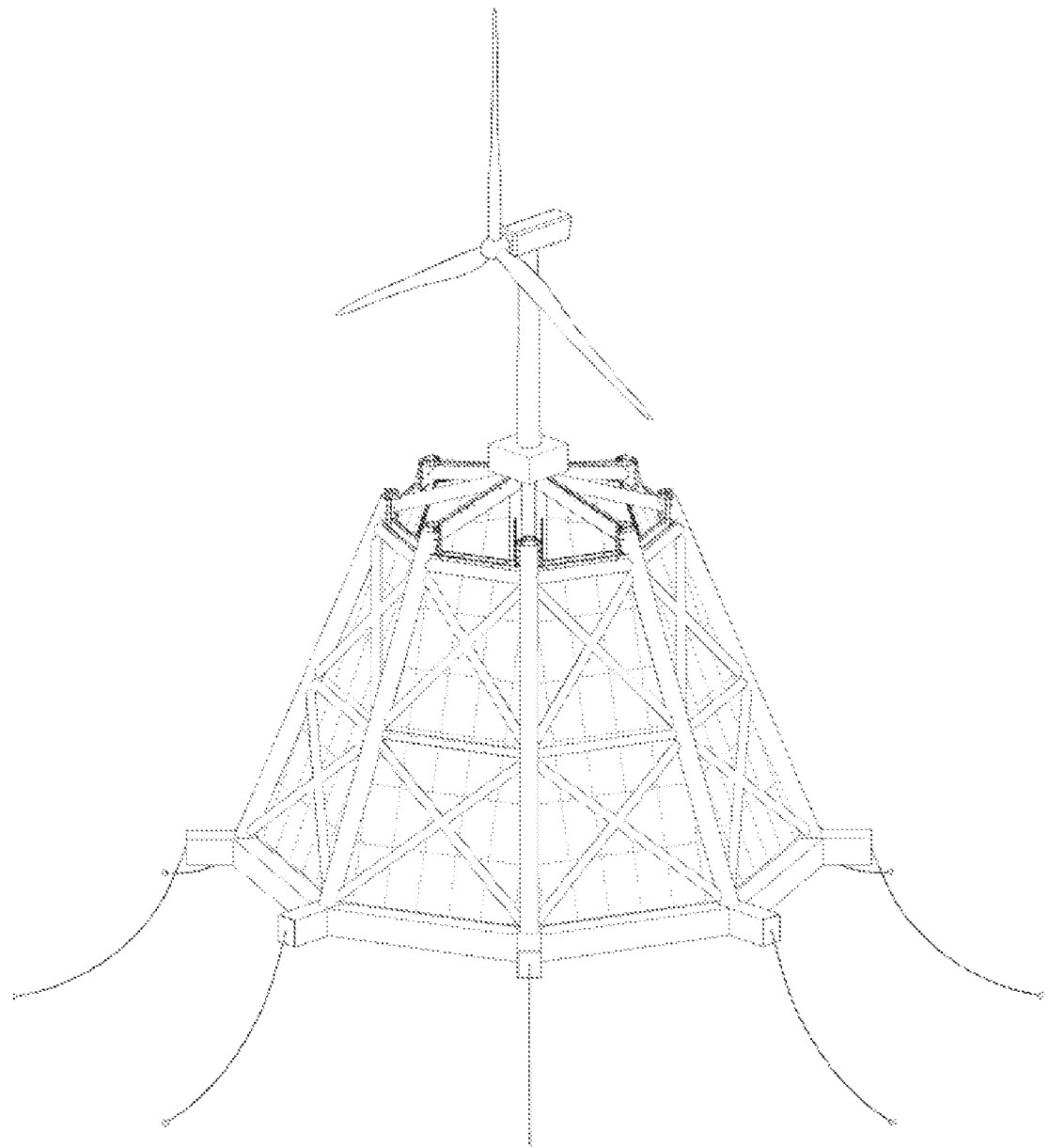
FIG. 10 is a schematic three-dimensional view according to an embodiment of the present invention.

In some embodiments, as shown in FIG. 1 and FIG. 9, the floating wind turbine foundation 4 is formed by a top pyramid structure and a bottom prismoid structure which includes a central column 43, several top radial braces 41, several top annular braces 42, several side inclined columns 44, several side braces 45, several bottom pontoons 46 and several bottom radial braces 47. The top of the central column 43 is rigidly connected to the lower end of the wind turbine tower 2 along the central vertical axial of the floating wind turbine foundation 4. The living quarter 3 is located right on the top of the central column 43. The two ends of each top annular brace 42 connect the upper ends of two adjacent side inclined columns 44 and all of the top annular braces 42 are located on the same horizontal plane as the top bordering structure connecting the bottom prismoid structure of the floating wind turbine foundation 4. This bordering structure is perpendicular to the central column 43 in space. Every two adjacent side inclined columns 44 are also connected into a steel frame by side braces 45. The two ends of each bottom pontoon 46 are respectively connected to the lower ends of two adjacent side inclined columns 44 (that is, the bottom pontoons 46 are circumferentially arranged at the bottom of the floating wind turbine foundation 4), and the two ends of each bottom radial brace 47 are respectively connected to the lower end of the central column 43 and the joint of two adjacent bottom pontoons 46. In this manner, a planar frame structure is formed between two adjacent side inclined columns 44 and each such structure consists of a top annular brace 42, several side braces 45, and a bottom pontoon 46 from top to bottom. The floating wind turbine foundation 4 comprises several such planar structures. All bottom radial braces 47 and bottom pontoons 46 are located on the same horizontal plane to form a keel frame structure of the bottom prismoid structure of the floating wind turbine foundation 4, and this keel frame structure is perpendicular to the central column 43 in space. All top radial braces 41 are evenly distributed in space and are of identical lengths and sloping angles. The upper end of the top radial brace 41 is connected to the upper end of the central column 43 and the lower end of the top radial brace 41 is connected to the upper end of the side inclined column 44, forming the top pyramid structure of the floating wind turbine foundation 4 (preferably, the lower end of the radial brace 41 is connected to the joint of two adjacent top annular braces 42 exactly on the upper end of side inclined column 44). In this way, a radial vertical plane of steel frame is formed by a top radial brace 41, a central column 43, a side inclined column 44 and a bottom radial brace 47. The floating wind turbine foundation 4 comprises several such radial vertical planes. As the top radial braces 41 are inclined, their merged center is the highest point of the floating wind turbine foundation 4. Thus, the entire living quarter 3 is furthermore higher than the sea level, and the impact of wave splashing and slamming on the living quarter 3 is avoided. In some embodiments, each component is rigidly connected at the corresponding joint. Components of the same name have identical geometrical dimensions and material properties and are symmetrically distributed with respect to the central column 43 in space. That means all of the top radial braces 41 have identical geometrical size and material and they are symmetrically distributed with respect to the central column 43 in space. This situation also applied to the top annular braces 42, the side inclined columns 44, the bottom pontoons 46, the bottom radial braces 47 and the side braces 45.

Figure 2:
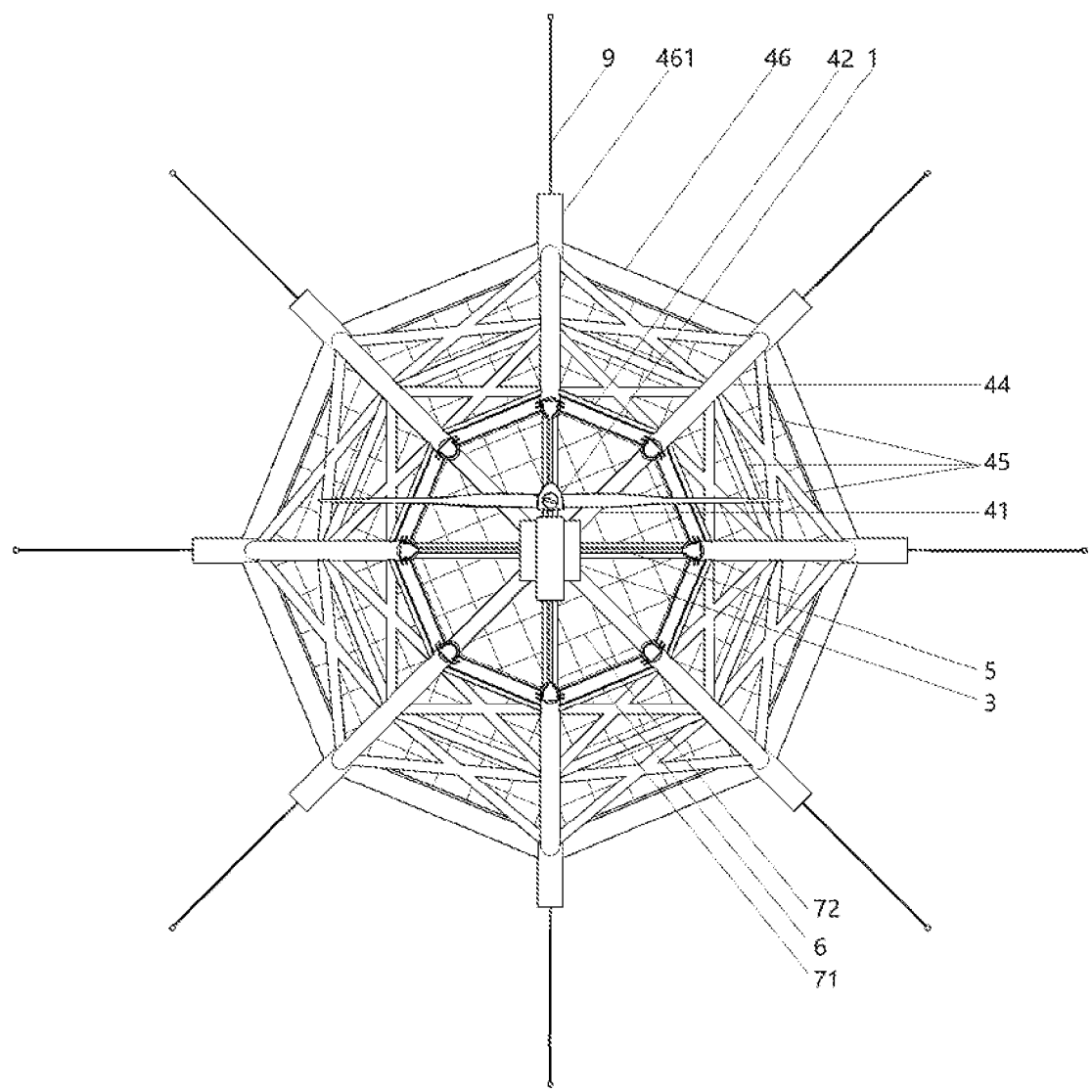
FIG. 2 is a top view of the floating offshore wind turbine integrated with a steel fish farming cage according to an embodiment of the present invention.
Figure 3:
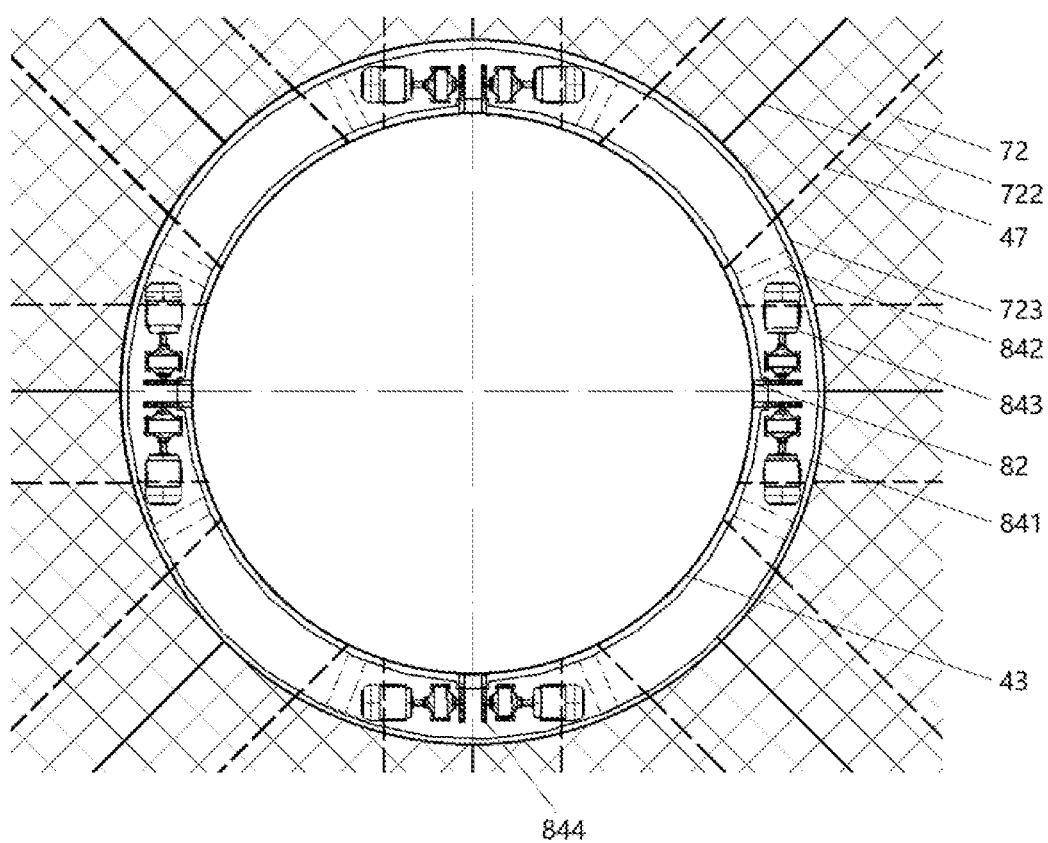
FIG. 3 is a top view of the layout of the central self-lifting system according to an embodiment of the present invention.

In some embodiments, the angle between the top radial braces 41 and the horizontal plane ranges from 10° to 45° and the taper angle of the bottom prismoid structure is from 60° to 80°. Both the top pyramid structure and the bottom prismoid structure are regular octagons or regular dodecagons (as shown in FIG. 2, preferably regular octagons in an example). The side braces 45 can be cross braces or diagonal braces or both.

In some embodiments, at the intersection of two adjacent bottom pontoons 46, a pontoon cantilever section 461 further extends radially along the bottom radial brace 47. The mooring system 9 is connected to this pontoon cantilever section 461. All of the bottom pontoons 46 and the pontoon cantilever sections 461 have inner sub-tanks for ballast.

Because the floating wind turbine foundation 4 is basically a conic steel structure with a small top and a large bottom, its center of gravity is low. During operational period, the center of buoyancy of the floating offshore wind turbine is always higher than the center of gravity. Besides, the high-density concrete placed in partial sub-tanks of ballast in the bottom pontoons 46 and pontoon cantilever sections 461 will further lower the center of gravity and therefore ensures that the center of buoyancy of the floating offshore wind turbine is always higher than the center of gravity. Generally in this invention the center of buoyancy of the floating offshore wind turbine is at least 1 m higher than the center of gravity such that the whole floating infrastructure is unconditional stable. The mooring system 9 is connected to the pontoon cantilever section 461 and can provide additional restoring moment to maintain the stability of the floating offshore wind turbine due to a large moment arm between the central axis of the floating wind turbine foundation 4 and the edge of cantilever section 461.

In some embodiments, the living quarter 3 includes a living area, a control hub and a bait warehouse. The fish-farming personnel will live in the living quarter 3 to monitor the farming process. The wind turbine maintenance staff can also temporarily live in the living quarter 3 to maintain the wind turbine 1.

The lateral net 71 is always tensioned. In some embodiments, the bottom net 72 also comprises several outer circumferential net ribs 721 along the bottom pontoons 46, several bottom radial net ribs 722, and an inner circumferential net rib 723 around the central column 43. Specifically, the outer circumferential net ribs 721 enclose and form the periphery of the bottom net 72, the inner circumferential net rib 723 is located at the center of the bottom net 72, and bottom radial net ribs 722 are evenly distributed on the bottom net 72, systematically integrating the outer circumferential net ribs 721 and the inner circumferential net rib 723 into the bottom net 72.

In some embodiments, the lifting systems include side self-lifting systems 83 located on the inner side of the floating wind turbine foundation 4 and a central self-lifting system 84 sleeved on the central column 43. The side self-lifting system 83 is installed onto the inner side of every side inclined column 44. The side self-lifting system 83 is connected to the side inclined column 44 by a primary track and functions along this track. The central self-lifting system 84 is connected to the central column 43 through secondary track and functions along this track.

In some embodiments, the bottom net 72 is connected to the side self-lifting systems 83 by the outer circumferential net ribs 721 and the bottom radial net ribs 722. The bottom net 72 is connected to the central self-lifting system 84 by the inner circumferential net rib 723. The bottom net 72 can be hoisted only by the side self-lifting system 83. In this case, the inner circumferential net rib 723 does not move, while the bottom net 72, the outer circumferential net rib 721 and the bottom radial net ribs 722 are lifted, so that the entire bottom net 72 gradually turns into a funnel shape. The bottom net 72 can also be wholly hoisted by both the side self-lifting systems 83 and the central self-lifting system 84. In this case, the inner circumferential net rib 723 enclosing the central column 43 moves upward vertically along the central column 43. During the normal aquaculture operation periods, the bottom net 72 is located at the bottom of the wind turbine foundation 4. When the bottom net 72 is lifted for capturing fish, the outer circumferential net ribs 721 always cling to the inner side of the lateral net 71.

Figure 5:
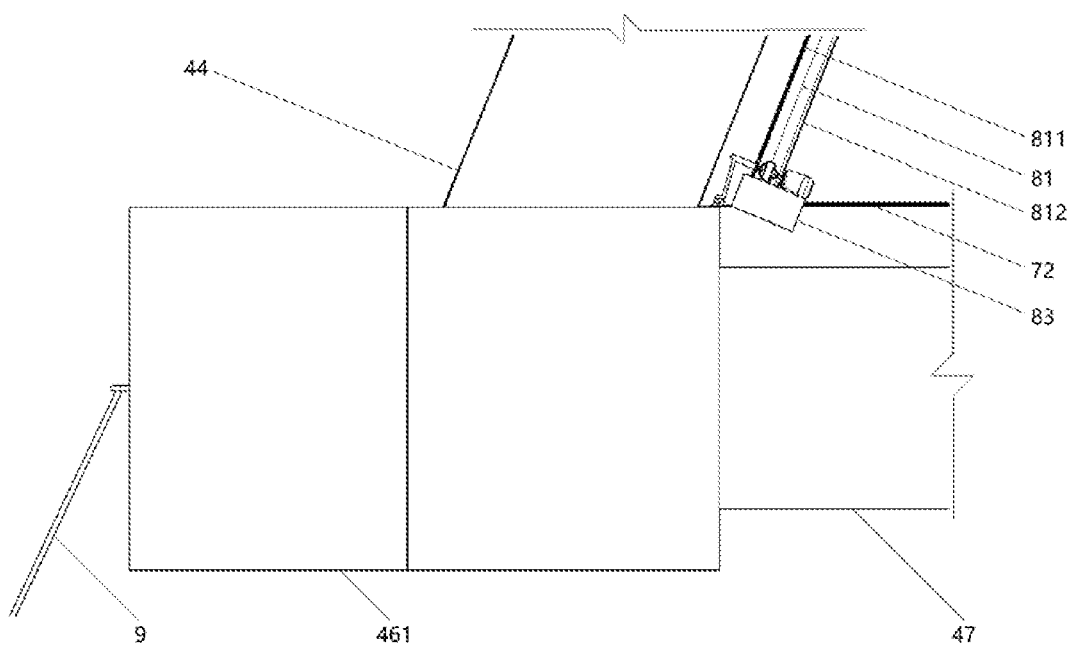
FIG. 5 is a front view of the layout of the side self-lifting system according to an embodiment of the present invention.
Figure 6:
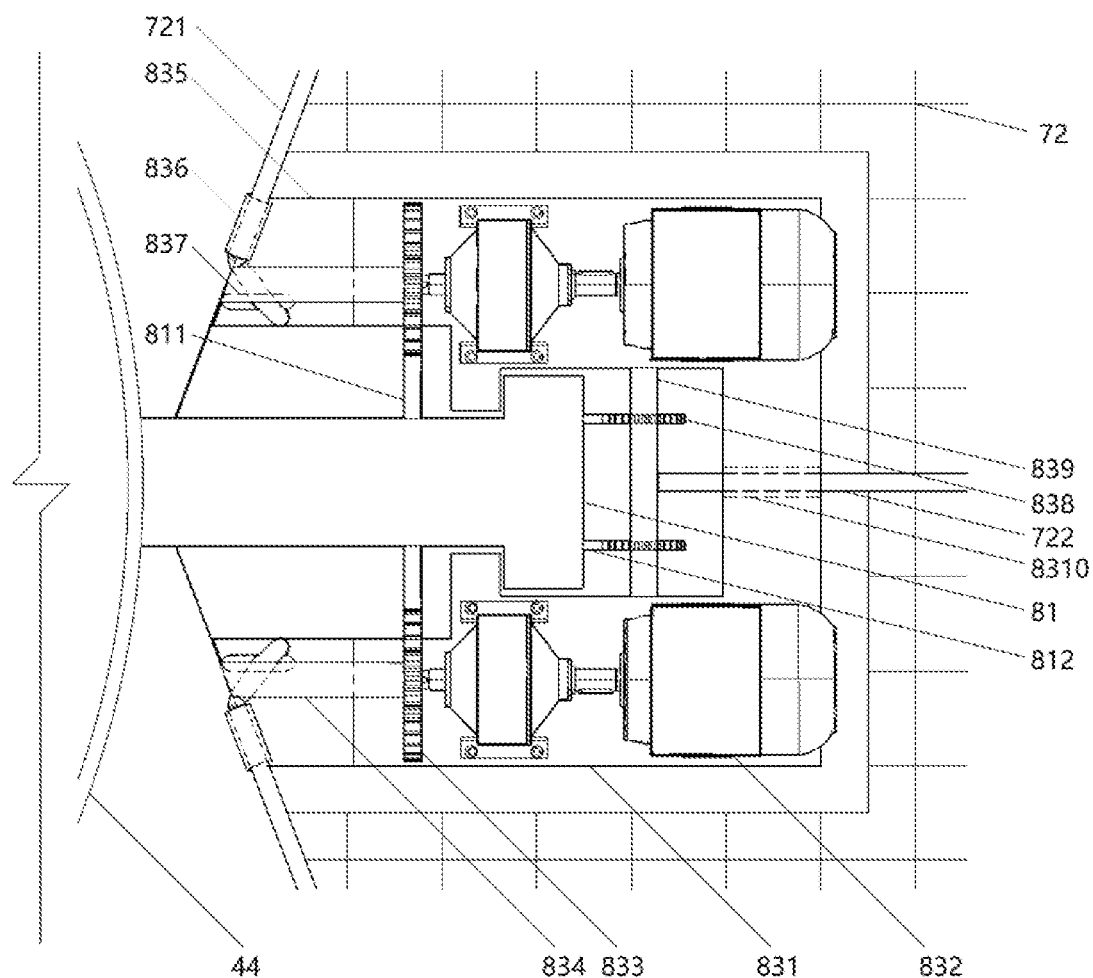
FIG. 6 is a top view of the layout of the side self-lifting system according to an embodiment of the present invention.
Figure 7:
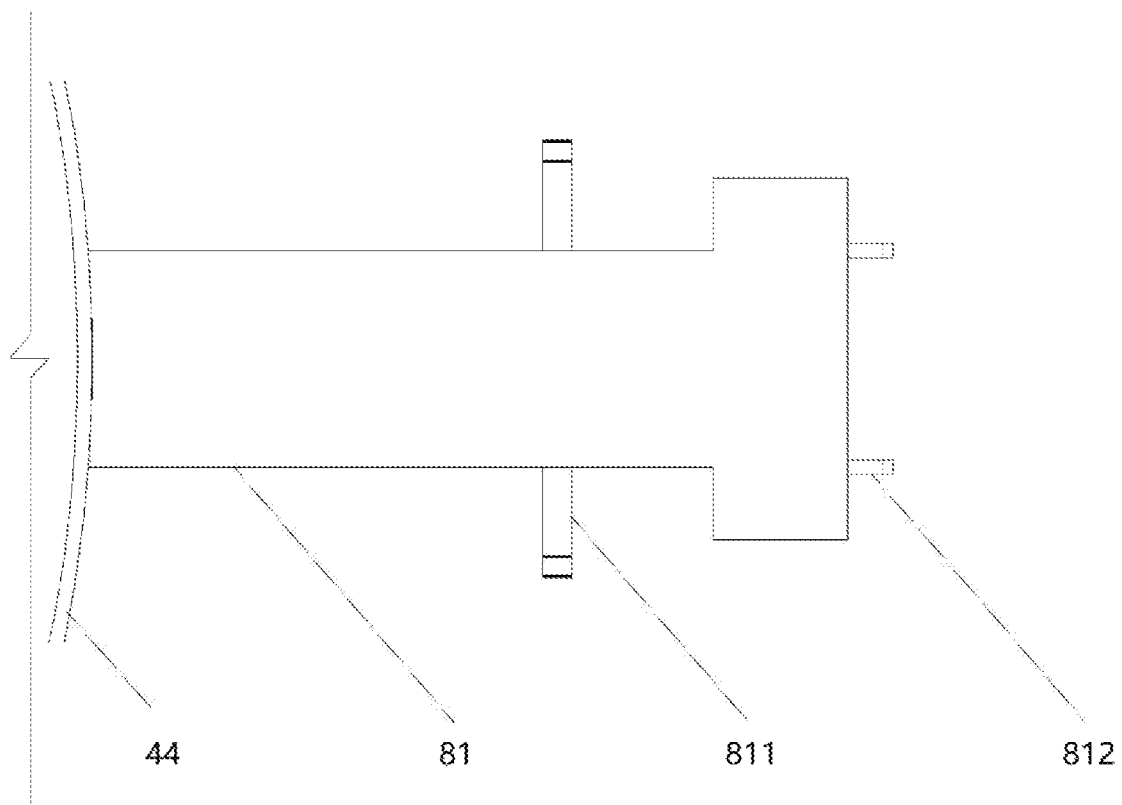
FIG. 7 is a schematic view of the layout of the primary track along the side column according to an embodiment of the present invention.

In some embodiments, as shown in FIG. 5, FIG. 6, and FIG. 7, the primary track comprises an inclined track 81, hoist gear tracks 811, and driven gear tracks 812. The inclined track 81 is fixedly connected (for example, welded) to the inner side of each side inclined column 44. As shown in FIG. 7, the cross section of the inclined track 81 is in a T shape. There is a hoist gear track 811 on each side of the inclined track 81 and the hoist gear track is fixedly connected (for example, welded) with the inclined track 81. At the end of the inclined track 81, there are two driven gear tracks 812. The driven gear tracks 812 are fixedly connected (for example, welded) with the inclined track 81. The vertical gear tracks 82 are fixed (for example, welded) on the surface of the central column 43 (the vertical gear track 82 can be used as an example of the secondary track described above).

In some embodiments, as shown in FIG. 5 and FIG. 6, the side self-lifting system 83 includes a lateral hoist platform 831, lateral hoist motors 832 fixed on the lateral hoist platform 831, lateral hoist gears 833, and driven gears 838. The side self-lifting system 83 is further equipped with outer circumferential net rib winding and unwinding scrolls 834 and a bottom radial net rib winding and unwinding scroll 839. The lateral hoist platform 831 is equipped with outer circumferential net rib winding and unwinding guide apparatuses and a radial net rib winding and unwinding guide apparatus. The lateral hoist platform 831 is a cuboid structure with a T-shaped notch, so that the lateral hoist platform 831 nest on the inclined track 81 and can move up and down along the inclined track 81. The driven gear 838 and the bottom radial net rib winding and unwinding scroll 839 are concentric and fixed to each other. The bottom radial net rib winding and unwinding scroll 839 is connected to the lateral hoist platform 831 by bearings. When the driven gear 838 rotates, the bottom radial net rib winding and unwinding scroll 839 is driven to rotate. The outer circumferential net rib 721 is connected to the outer circumferential net rib winding and unwinding scroll 834 by the outer circumferential net rib winding and unwinding guide apparatus. The outer circumferential net rib winding and unwinding scroll 834 and the lateral hoist gear 833 are concentric and fixed to each other. When the lateral hoist motor 832 works, the lateral hoist gear 833 rotates, and the outer circumferential net rib winding and unwinding scroll 834 is driven to rotate, to wind or unwind the outer circumferential net rib 721. The lateral hoist gear 833 and the hoist gear track 811 on each side of the inclined track 81 are interlocked. A spindle of the lateral hoist motor 832 is assembled with the hoist gear 833 by a deceleration box. The lateral hoist motor 832 drives the lateral hoist gear 833 to roll along the hoist gear track 811 to lift the side self-lifting system 83 along the inclined track 81. One end of the bottom radial net rib 722 is connected to the bottom radial net rib winding and unwinding scroll 839 by the radial net rib winding and unwinding guide apparatus. The driven gear 838 and the driven gear track 812 are interlocked, and the lateral hoist platform 831 drives the driven gear 838 to rotate which then drives the bottom radial net rib winding and unwinding scroll 839 to rotate, and to further wind or unwind the bottom radial net rib 722. The dimensions of the lateral hoist gear 833, the outer circumferential net rib winding and unwinding scroll 834, the driven gear 838 and the bottom radial net rib winding and unwinding scroll 839 are designed to meet certain requirements, to ensure that the outer circumferential net ribs 721 and the bottom radial net ribs 722 always stay in a tensioned state when the side self-lifting system 83 is being lifted. Keeping the outer circumferential net ribs 721 in tension while the bottom net 72 is being lifted is to ensure that gaps between the bottom net 72 and the lateral net 71 are sufficiently small to prevent fish escaping from the fishing cage. Keeping the bottom radial net ribs 722 in tension is for clustering fish and a more convenient capture.

Figure 8:
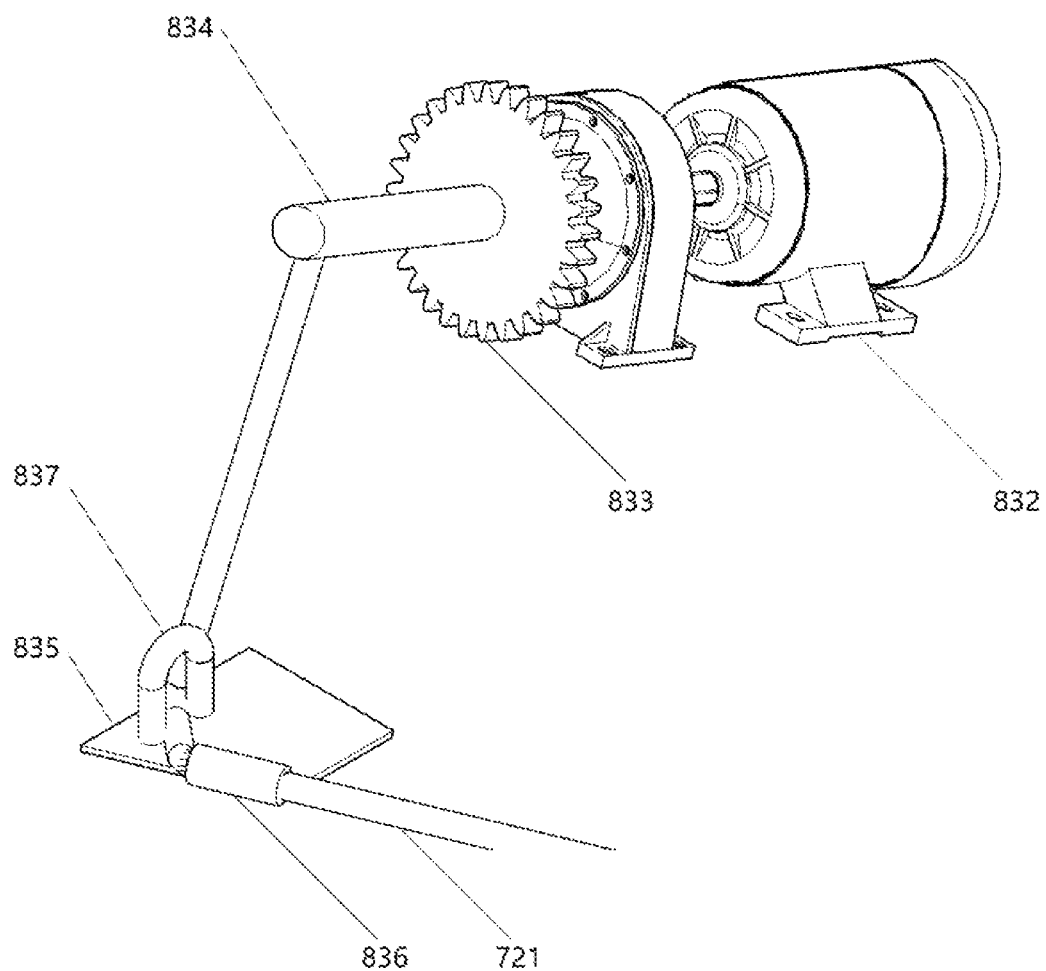
FIG. 8 is a schematic view of winding and unwinding of the outer circumferential net rib according to an embodiment of the present invention.

In some embodiments, the outer circumferential net rib winding and unwinding guide apparatus includes an extension plate 835, a pipe 836, and a U-shaped lifting lug 837. The extension plate 835 is fixedly connected (for example, welded) to the lateral hoist platform 831 (as shown in FIG. 6 and FIG. 8). The pipe 836 and the U-shaped lifting lug 837 are fixedly connected (for example, welded) to the extension plate 835. The inner diameter of the pipe 836 is larger than the diameter of the outer circumferential net rib 721. The outer circumferential net rib 721 passes through the pipe 836 and the U-shaped lifting lug 837 and is connected to the outer circumferential net rib winding and unwinding scroll 834. One of the two ends of the bottom radial net rib 722 is connected to the bottom radial net rib winding and unwinding scroll 839.

In some embodiments, the lateral hoist platform 831 conveys an opening 8310 (for example, a circular hole). As the radial net rib winding and unwinding guide apparatus, the diameter of the opening 8310 is larger than the diameter of the bottom radial net rib 722. The bottom radial net rib 722 passes through the opening 8310 and is connected to the bottom radial net rib winding and unwinding scroll 839.

In some embodiments, the central self-lifting system 84 comprises a central hoist platform 841, central hoist motors 843, and central hoist gears 844. The central hoist motors 843 are fixed onto the central hoist platform 841. The central hoist platform 841 is a hollow cylinder, and the inner diameter of the central hoist platform 841 is slightly larger than the outer diameter of the central column 43. The central hoist platform 841 is sleeved along the surface of the central column 43. One end of the bottom radial net rib 722 is connected to the bottom radial net rib winding and unwinding scroll 839 and the other end is connected to the inner circumferential net rib 723. The inner circumferential net rib 723 is fixed onto the surface of the central hoist platform 841 in order to connect the bottom net 72 with the central self-lifting system 84. The central hoist gear 844 and the vertical gear track 82 are interlocked. A spindle of the central hoist motor 843 is connected to the central hoist gear 844 by a deceleration box, and the central hoist motors 843 drive the central hoist gear 844 to roll along the vertical gear track 82 to lift the central self-lifting system 84.

Preferably, four groups of the vertical gear tracks 82 are welded on the surface of the central column 43, and each group consists of two vertical gear tracks. Correspondingly, four groups of central hoist motors 843 can be hosted by the central hoist platform 841, and each group consists of two hoist motors. In addition, each lateral hoist platform 831 is driven by two lateral hoist motors 832.

Figure 4:
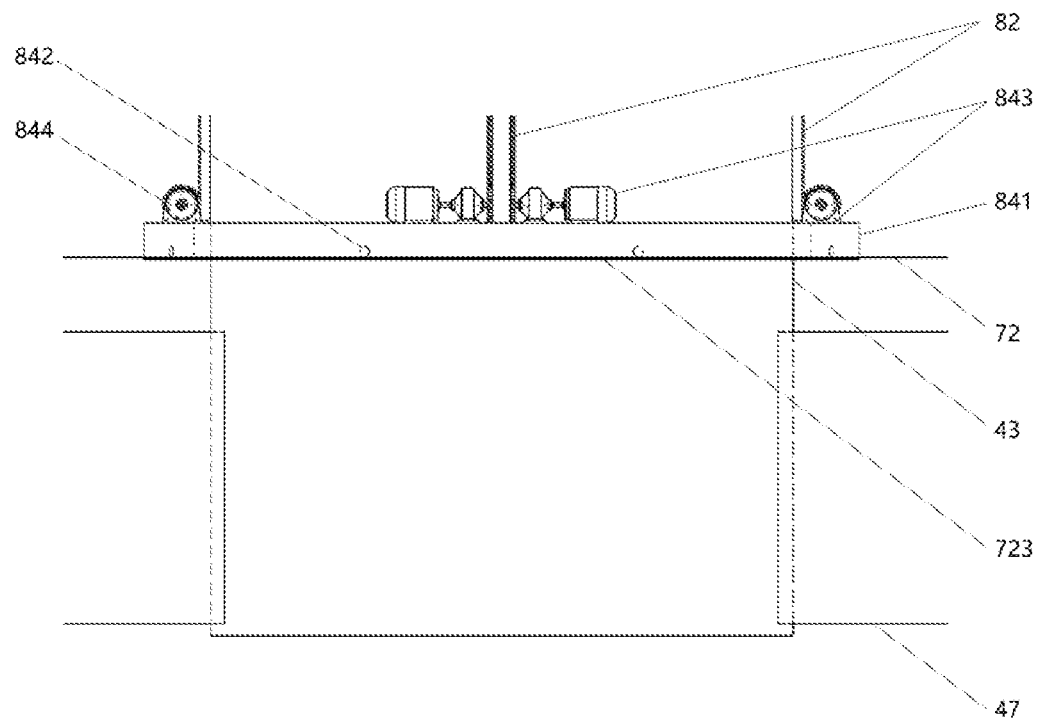
FIG. 4 is a front view of the layout of the central self-lifting system according to an embodiment of the present invention.

In some embodiments, as shown in FIG. 4, the central hoist platform 841 conveys several openings 842 for collecting dead fish and precipitated baits. These openings 842 are located above the connection between the inner circumferential net rib 723 and the central hoist platform 841. The central hoist platform 841 hosts a gathering system to collect the dead fish and precipitated baits.

In some embodiments, the top annular braces 42 host work platforms 6, and the top annular braces 42 are equipped with rubber fenders to berth ships for the purposes of convenient fish catching and transfer of goods, equipment and personnel. Steel guardrail passages 5 are welded on the top radial braces 41 (for example, at least in the east, west, south and north), to provide access between the living quarter 3 and the work platform 6.

In some embodiments, the floating wind turbine foundation 4 hosts a large number of sensors to monitor the water quality and activity of caged fish. All the real-time collected information is transferred to the control hub in the living quarter 3.

In some embodiments, each mooring system 9 comprises a windlass and anchor chains connected to this windlass. The windlass is placed inside the floating wind turbine foundation 4, and the anchor chains hang from the pontoon cantilever section 461. The whole floating offshore wind turbine system is anchored by the anchor chains.

Before the floating offshore wind turbine system goes offshore, construction of the floating offshore wind turbine foundation 4 is first completed in a dockyard. The floating wind turbine foundation 4 is a large-scale steel structure and is symmetrical. To speed up the construction progress and to reduce aerial work, welding of each planar structure for the side frame of the floating wind turbine foundation 4 can be completed in advance in a factory, and then transported to the dockyard for overall assembling. After the major structure of the floating wind turbine foundation 4 is completed, the side self-lifting systems 83 and the central self-lifting system 84 are then installed. The service lives of both the lateral net 71 and the bottom net 72 exceed 20 years. They can be customized in accordance with the size of the cage. The module of living quarter 3 can also be constructed in advance in a factory. The wind turbine 1 and the wind turbine tower 2 can be assembled without the aid of dockyard. After the construction of the floating wind turbine foundation is done, the wind turbine 1 and the wind turbine tower 2 are entirely hoisted above the central column 43 to complete the mating between the wind turbine tower 2 and the central column 43. Then, the living quarter 3 is hoisted and installed, and finally, the lateral net 71 and the bottom net 72 are installed. When the lateral net 71 is being installed, it is required to be in tension. After all construction and installation works are completed, the dockyard gate is opened to receive seawater. The floating wind turbine foundation 4 then floats with the recourse of buoyancy, and a tugboat is used to tow the entire infrastructure out of the dockyard to destined waters. After the infrastructure arrives, the ballast tanks in the bottom pontoons 46 start to pump seawater into the bottom pontoons 46. The wind turbine foundation and the infrastructure then gradually sink to the prescribed draft. After that, the anchor chains are used to moor the entire infrastructure onto the seabed. In the present invention, because the wind turbine 1 and the wind turbine tower 2 have been installed at the dockyard, the offshore installation is saved, and both cost and period of marine operation can be heavily reduced.

During normal operations, part of the power generated by the wind turbine 1 is supplied for the living quarter 3, the sensors in the cage and so on. The remaining power is transmitted to coastal cities in vicinity by submarine cables and booster stations. The fish farming personnel live in the living quarter 3 and controls fish farming in real time, including feeding, cage cleaning, collection of dead fish, etc. Multiple feeding machines are placed on the steel guardrail passages 5 of the top radial braces 41, and the feeding machines directly transport baits via hoses to deep water layers with crowded fish. For net cleaning, the underwater hyperbaric cleaning device can be used. At present, there are mature products of hyperbaric cleaning devices available in the market. When the dead fish or precipitated baits come into being at the bottom of the cage, the side self-lifting systems 83 are activated. The side self-lifting systems 83 will lift the outer circumferential of the bottom net 72 to a desired height. In this case, the entire bottom net 72 is in a funnel shape (that is, the outer circumferential of the bottom net 72 is higher than the center), and under the action of gravity the dead fish or the precipitated baits will slide downward to the openings 8310 of the central hoist platform for being collected. They will be processed offshore and transported to land to avoid marine pollution. The bait transport ship regularly provides baits and living stuffs for the fish farming staff, and the wind turbine maintenance ship regularly provides operation and maintenance services for the wind turbine 1. The bait transport ship and the wind turbine maintenance ship berth against the top annular brace 42. The baits are directly delivered to the bait warehouse in the living quarter 3 via a hose. Living stuffs can be hoisted onto the work platform 6, and the wind turbine maintenance personnel can securely board the work platform 6 from the wind turbine maintenance ship.

When the farmed fish enters the mature period for catching, both the side self-lifting systems 83 and the central self-lifting system 84 start to hoist the bottom net 72. After the bottom net 72 is hoisted to the desired height (preferably to the height of the work platform 6 to facilitate catching), fish is driven into a small space in water, and then a fish pump is used to suck the fish to the ship. After the catching is completed, the bottom net 72 is restored to the bottom of the cage to initiate a new period of fish farming.

The above contents are detailed descriptions of the present application in conjunction with specific preferred implementations, and it should not be considered that the specific implementations of the present application are limited to these descriptions. Those of ordinary skills in the art may also make some deductions or replacements without departing from the conception of the present application and all of such deductions or replacements should be considered to be within the scope of the protection as determined by the claims.

What is claimed is:
1. A floating offshore wind turbine integrated with a steel fish farming cage, comprising a wind turbine, a wind turbine tower, a living quarter, a floating wind turbine foundation, and a mooring system, wherein
   the floating wind turbine foundation is a conic steel structure with a small top and a large bottom;
   the upper end of the wind turbine tower bears the wind turbine, and the lower end of the wind turbine tower is fixed on the floating wind turbine foundation, the living quarter is at the wind turbine tower base, and the mooring system is connected to the floating wind turbine foundation and is used to moor the floating wind turbine foundation to seabed; and
   the floating offshore wind turbine integrated with a steel fish farming cage further comprises a lateral net, a bottom net, and lifting systems, the lateral net is tensioned, and is attached onto side facets of the conic floating wind turbine foundation, and the lifting systems are placed inside the floating wind turbine foundation, and are connected to the bottom net, so that the bottom net can be lifted inside the floating wind turbine foundation,
   wherein the floating wind turbine foundation is formed by a top pyramid structure and a bottom prismoid structure, and comprises a central column, several top radial braces, several top annular braces, several side inclined columns, several side braces, several bottom pontoons, and several bottom radial braces,
   the top of the central column is rigidly connected to the lower end of the wind turbine tower, and the central column is located on the central axial of the floating wind turbine foundation, and the living quarter is located on the top of the central column,
   two ends of each top annular brace connect the upper ends of two adjacent side inclined columns; all of the top annular braces are located on the same horizontal plane to form the top bordering structure connecting the bottom prismoid structure of the floating wind turbine foundation; this bordering structure is perpendicular to the central column, every two adjacent side inclined columns are connected into a steel frame by side braces, two ends of each bottom pontoon are respectively connected to the lower ends of two adjacent side inclined columns, two ends of each bottom radial brace are respectively connected to the lower end of the central column and the joint of two adjacent bottom pontoons; all bottom radial braces and bottom pontoons are located on the same horizontal plane to form the keel frame structure of the bottom prismoid structure of the floating wind turbine foundation, and the keel frame structure is perpendicular to the central column; and all top radial braces are evenly distributed in space and are of identical sloping angles, the upper end of the top radial brace is connected to the upper end of the central column, and the lower end of the top radial brace is connected to the upper end of the side inclined column to form the top pyramid structure of the floating wind turbine foundation.

2. The floating offshore wind turbine integrated with a steel fish farming cage according to claim 1, wherein
all of the top radial braces have identical geometrical dimensions and material, and are symmetrically distributed with respect to the central column in space.

3. The floating offshore wind turbine integrated with a steel fish farming cage according to claim 1, wherein all of the top annular braces have identical geometrical dimensions and material, and are symmetrically distributed with respect to the central column in space.

4. The floating offshore wind turbine integrated with a steel fish farming cage according to claim 1, wherein all of the side inclined columns have identical geometrical dimensions and material, and are symmetrically distributed with respect to the central column in space.

5. The floating offshore wind turbine integrated with a steel fish farming cage according to claim 1, wherein all of the bottom pontoons have identical geometrical dimensions and material, and are symmetrically distributed with respect to the central column in space.

6. The floating offshore wind turbine integrated with a steel fish farming cage according to claim 1, wherein all of the side braces have identical geometrical dimensions and material, and are symmetrically distributed with respect to the central column in space.

7. The floating offshore wind turbine integrated with a steel fish farming cage according to claim 1, wherein all of the bottom radial braces have identical geometrical dimensions and material, and are symmetrically distributed with respect to the central column in space.

8. The floating offshore wind turbine integrated with a steel fish farming cage according to claim 1, wherein the side braces can be cross braces or diagonal braces or both.

9. The floating offshore wind turbine integrated with a steel fish farming cage according to claim 1, wherein a pontoon cantilever section further extends radially along the bottom radial brace at the intersection of two adjacent bottom pontoons, and the mooring system is connected to the pontoon cantilever section; and all of the bottom pontoons and the pontoon cantilever sections have sub-tanks for ballast.

10. The floating offshore wind turbine integrated with a steel fish farming cage according to claim 1, wherein in the angle between the top radial braces and the horizontal plane ranges from 10° to 45°; the taper angle of the bottom prismoid structure is from 60° to 80°; and both the top pyramid structure and the bottom prismoid structure are regular octagons or regular dodecagons.

11. The floating offshore wind turbine integrated with a steel fish farming cage according to claim 1, wherein the lifting systems include side self-lifting systems located on the inner side of the side inclined columns and a central self-lifting system sleeved on the central column; the side self-lifting system is connected to the side inclined column by a primary track and functions along the primary track, and the central self-lifting system is connected to the central column by secondary track and functions along the secondary track.

12. The floating offshore wind turbine integrated with a steel fish farming cage according to claim 11, wherein the bottom net comprises several outer circumferential net ribs, several bottom radial net ribs, and an inner circumferential net rib, the outer circumferential net ribs enclose and form the periphery of the bottom net, the inner circumferential net rib is located at the center of the bottom net, and the bottom radial net ribs are evenly distributed on the bottom net and integrates the outer circumferential net ribs and the inner circumferential net rib into the bottom net.

13. The floating offshore wind turbine integrated with a steel fish farming cage according to claim 12, wherein the bottom net is connected to the side self-lifting systems by the outer circumferential net ribs and the bottom radial net ribs; and the bottom net is connected to the central self-lifting system by the inner circumferential net rib.

14. The floating offshore wind turbine integrated with a steel fish farming cage according to claim 1, wherein
the top annular braces host work platforms, and the top annular braces are equipped with rubber fenders on the outer sides of the top annular braces; and
a steel guardrail passage is welded on at least one of the top radial braces, and the steel guardrail passage provides access between the living quarter and the work platform.

* * * * *